Aug. 8, 1939.　　　　M. MICHEL　　　　2,169,029
PROTECTIVE RELAY SYSTEM FOR SYNCHRONOUS MACHINES
Filed Jan. 16, 1937

WITNESSES:
Michael Steck
Joe Weber

INVENTOR
Mathias Michel.
BY
G. M. Crawford
ATTORNEY

Patented Aug. 8, 1939

2,169,029

UNITED STATES PATENT OFFICE 2,169,029

PROTECTIVE RELAY SYSTEM FOR SYNCHRONOUS MACHINES

Mathias Michel, Wauwatosa, Wis., assignor to Westinghouse Electric & Manufacturing Company, East Pittsburgh, Pa., a corporation of Pennsylvania Application January 16, 1937, Serial No. 120,928

9 Claims. (Cl. 172—289)

My invention relates, generally, to a relay system, and, more particularly, to a locked rotor protective relay system for synchronous machines.

The object of my invention, generally stated, is to provide a device for preventing sustained energization of a synchronous machine in the event that the rotor locks or fails to rotate upon being energized.

A more specific object of my invention is to provide a relay system responsive to the rotating or standstill condition of a synchronous machine for preventing sustained energization of the machine in the event that the rotor fails to rotate upon being energized.

A further object of my invention is to provide a protective relay system which shall function to open the starting switch of a synchronous machine in the event that the machine fails to rotate at a predetermined speed within a predetermined time after the starting switch has been closed.

Another object of my invention is to provide a relay system which shall function to indicate whether or not a synchronous machine is rotating at a predetermined time after the machine is energized.

A still further object of my invention is to provide a locked rotor protective relay system which may be constructed for the most part of standard relays and switching apparatus and which may be easily installed and operated.

A further object of my invention is to provide a locked rotor protective relay system which shall be inexpensive to manufacture and install and which will require no mechanical connection with the machine with which it is associated.

Other objects of my invention will be apparent from the description of the invention which is to follow and the appended claims.

In practicing my invention in its preferred form, a relay system, which includes timing relays and other relays responsive to the condition of rotation or standstill of the rotor of a synchronous machine which it is desired to start, is set into operation when the starting switch of the machine is closed and functions to open the starting switch in the event that the rotor of the machine does not rotate appreciably within a time after closing the starting switch which depends upon the time delay of the timing relays.

Figure 1:
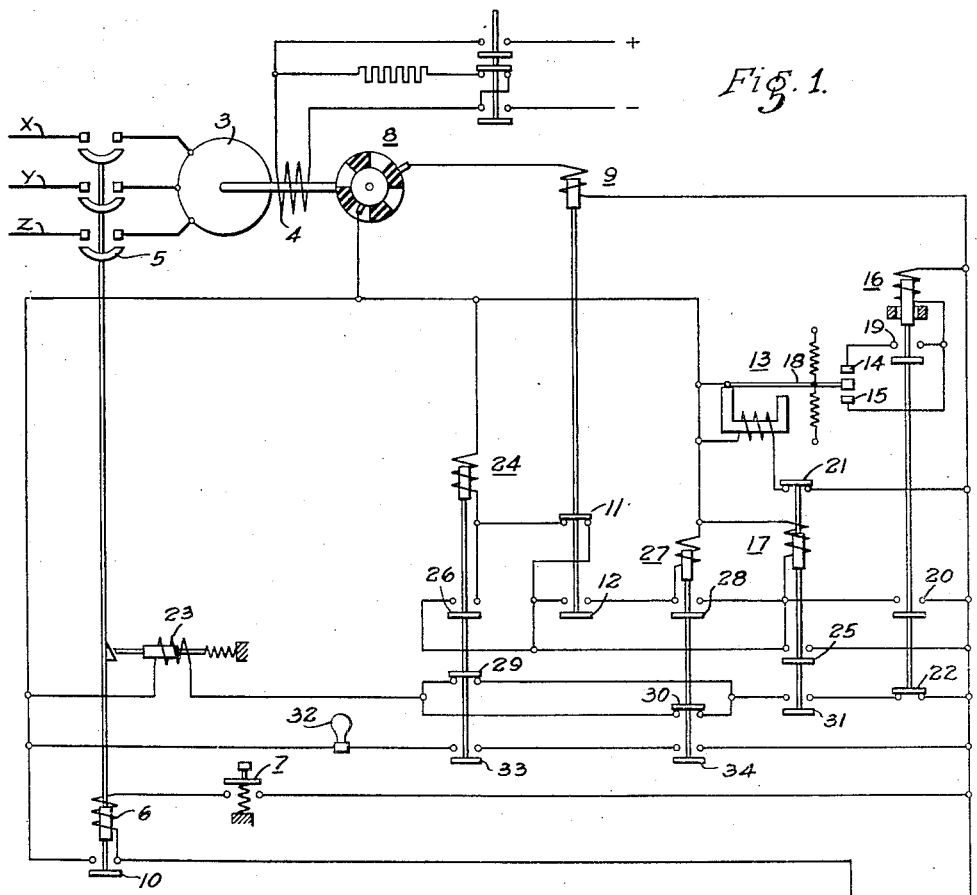
Figure 2:
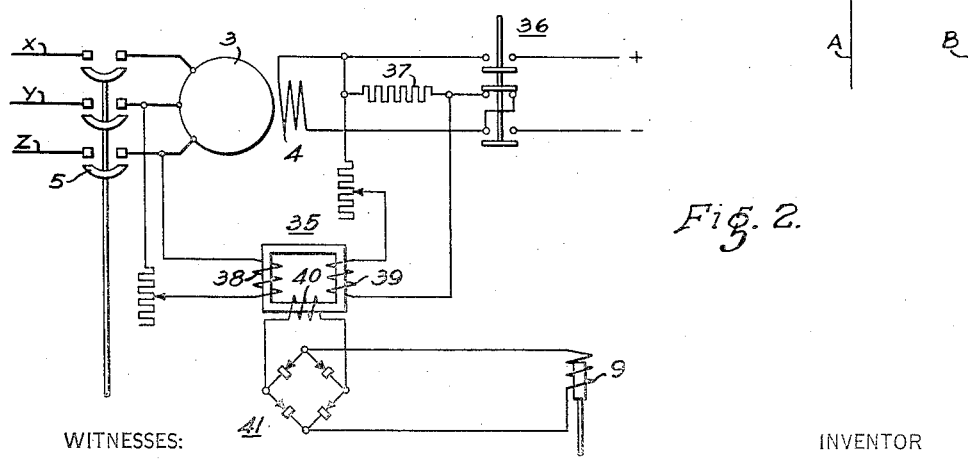

Further objects and advantages of my invention will be apparent from the following description in connection with the accompanying drawing, in which:

Figure 1 is a diagrammatic illustration of the elements of structure of the preferred embodiment of my invention in their cooperative relationships, in which the control relay system is actuated by an interrupter driven by the shaft of the synchronous machine, and Fig. 2, which is a modification in which the relay system is actuated by impulses derived from combining the frequency applied to the alternating current windings of the machine with the frequency induced in the field winding of the machine.

Referring to Fig. 1, I have shown the alternating current or stator winding 3 of a synchronous machine connected to be energized from alternating current power source X—Y—Z by closing circuit breaker 5. Circuit breaker 5 is closed by energizing its closing coil 6 from the source of control power represented by conductors A—B through a contactor 7. This contactor may be a hand switch or a remotely controlled switching device such as is commonly used in automatic sub-stations.

Actuation of closing coil 6 also causes closure of contact members 10 to supply potential to the relay system from the source of control current A—B.

A timing device is provided in relays 13, 16 and 17. Relay 13 is a vibrating relay which, when energized, closes contact 15 to energize relay 16, which is a slow dropout relay. When relay 13 is deenergized, armature 18 oscillates alternately closing contacts 14 and 15 for a period depending upon the weight of the armature and its spring support.

The time delay for release of relay 16 is so designed as to prevent the armature of relay 16 from dropping out in the period between the breaking at contact 14 and making at 15, and vice versa. It will be noted that contact members 19 of relay 16 are closed upon the initial closure of contact 15 by energization of relay 13. The closure of contact members 19 establishes a circuit to relay 16 through contact 14. The purpose of contact members 19 is to positively de-energize relay 16 once vibrating relay 13 begins to vibrate at such low amplitudes as to fail to positively maintain circuits through contacts 14 and 15.

Upon the initial energization of relay 16, contact members 20 are closed to energize relay 17 and to thereby open contact members 21. The opening of contact members 21 de-energizes relay 13 to start the timing period determined by relay 13.

At the time that relay 16 was energized, its contact members 22, which are connected in the control circuit for the trip coil 23 of circuit breaker 5 were open, thus rendering this trip circuit inoperative. At the end of the vibrating period of armature 18, relay 16 will again be de-energized to allow contact members 22 to close.

An interrupter 8 is provided for alternately making and breaking the circuit to relay 9, whereby contact members 11 are closed and contact members 12 opened when relay 9 is de-energized, and contact members 11 opened and 12 closed when relay 9 is energized. Auxiliary control relay 24 is controlled by contact members 11 of relay 9 and contact members 25 of relay 17. When energized, relay 24 closes its own holding circuit through contact members 26 and 25.

Auxiliary control relay 27 is controlled by contact members 12 of relay 9 and contact members 25 of relay 17. When energized, relay 27 closes its own holding circuit through contact members 28 and 25.

A control circuit for the trip coil 23 of circuit breaker 5 is provided through contact members 29 and 30 of relays 24 and 27, respectively, in parallel, contact members 31 of relay 17 and contact members 22 of relay 16.

An indicator 32 which may be a lamp or any other enunciator is controlled by a series circuit which includes contact members 33 of relay 24 and contact members 34 of relay 27.

In the operation of my device, when it is desired to start the synchronous machine, control switch 7 is closed to energize the closing coil for circuit breaker 5 thus connecting the alternating current winding of the machine with the power source conductors X—Y—Z. When switch 5 is closed, contact members 10 close to energize relay 13.

Energization of relay 13 starts the timing relay system by causing closure of contact 15, thus energizing relay 16. Energization of relay 16 causes closure of contact members 20 which energizes relay 17, causing contact members 21 to open, which, in turn, de-energize relay 13.

When relay 13 is de-energized, armature 18 will oscillate to alternately open and close contacts 14 and 15, thus keeping relay 16 intermittently energized and causing relay 16, by virtue of its slow release characteristic, to hold its contact members 19 and 20 closed and its contact members 22 open. At the end of the oscillation period of armature 18, relay 16 will be de-energized, allowing contact members 19 and 20 to open and causing contact members 22 to close.

It will be noted that relay 17 is held energized through its own contact members 25 after it is initially energized by the closure of contact members 20. This circuit will be maintained even after contact members 20 are opened by the energization of relay 16.

Assuming that, when the sychronous machine and the relay control circuit are energized, the interrupter is in the position shown in the drawing, and further assuming that for some reason the machine fails to rotate, it will be noted that relay 9 will not be energized. At this time, relay 24 will be energized through contact members 11 of relay 9 and 25 of relay 17. Energization of relay 24 will cause it to close contact members 26 and 33 and to open contact members 29.

Under these conditions, at the end of the predetermined time which is governed by the characteristics of vibrating relay 13, a circuit will be made through the trip coil 23 of circuit breaker 5, causing the circuit breaker to de-energize the synchronous machine. This circuit comprises contact members 22, 31 and 30 and coil 23.

If, when the synchronous machine is energized and fails to rotate the interrupter is in such a position as to cause energization of relay 9, contact members 12 of relay 9 will be closed and a cricuit will be established through contact members 12 and 25 to energize relay 27. Relay 27 will open contact members 30 and close contact members 28 and 34, the closure of contact members 28 establishing a holding circuit for relay 27 through contact members 28 and 20.

Under these conditions, trip coil 23 will be energized through a circuit which comprises contact members 22, 31 and 29 and coil 23. This will cause circuit breaker 5 to open to de-energize the synchronous machine.

If the synchronous machine starts to rotate properly when it is energized, interrupter 8 will be rotated and this will cause alternate energization and de-energization of relay 9. In the de-energized period of relay 9, relay 24 will be energized as explained above and will hold itself energized causing contact members 29 to be held open and contact members 33 to be held closed.

In the energized period of relay 9, relay 27 will be energized as explained above and will hold itselft energized through its holding circuit. This will cause contact members 30 to be held open and contact members 34 to be held closed.

Under these conditions, when the predetermined time governed by the characteristics of vibrating relay 13 has elapsed, contact members 22 will close, but the energization of relays 24 and 27 having been brought about by the rotation of interrupter 8, both contact members 29 and 30 will be open, thus preventing energization of the trip coil 23 for circuit breaker 5.

When relays 24 and 27 are both held energized because of the rotation of the machine, their contact members 33 and 34 will be held closed, causing energization of the indicator 32, thus indicating to the operator that the machine is starting properly.

In Fig. 2, I have shown a modification in which a different means for providing the impulses for energizing and de-energizing relay 9 is employed. In using the device of Fig. 2, the relay system of Fig. 1 would be employed with the exception of the interrupter 8 and the connections for energizing relay 9. Like reference characters refer to the corresponding parts in the two figures.

In Fig. 2 I have shown a field coil 4 for the synchronous machine controlled by a switch 36 which may be a hand operated switch or any switch automatically controlled by predetermined conditions of operation of the machine. This switch is shown in a position in which it connects a resistance 37 in shunt with the field winding. This is the resistance which is commonly used as a discharge resistance for a field winding when breaking the energizing current of such a field. In the other position of the switch 36, the field winding would be connected to a source of direct current which would energize the field winding for normal operation of the synchronous machine.

A transformer 35, having opposed windings 38 and 39 and an auxiliary winding 40, is provided. Winding 38 is connected to the leads of the synchronous machine so as to be energized by the alternating current which energizes the machine.

Transformer winding 39 is connected across the field winding 4. Auxiliary winding 40 is connected in circuit with a full wave rectifier unit 41 and this rectifier unit is connected to energize relay coil 9.

In the operation of the modification of Fig. 2, when the circuit breaker 5 is closed transformer coil 38 is energized at the frequency of the power source. If the synchronous machine fails to rotate, an electromotive force will be induced in the field winding 4 which will be of the same frequency as that which is applied to the alternating current winding 3 of the synchronous machine. This will cause energization of transformer coil 39 at the frequency of the power source.

Energization of both of the opposing coils 38 and 39 at the same frequency will cause them to neutralize each other in their effect on the transformer core and no resulting electromotive force will be induced in auxiliary transformer coil 40.

Under these conditions, relay coil 9 will remain de-energized and the relay system will operate to trip circuit breaker 5, as was explained hereinbefore under the conditions in which the relay 9 was held de-energized by failure of the interrupter 8 to rotate.

If the synchronous machine starts to rotate properly when it is energized an electromotive force will be induced in field winding 4 at a frequency which is less than the frequency applied to the alternating current winding 3 of the synchronous machine by an amount which is determined by the ratio of the speed of the machine to its synchronous speed. In this manner, the power source frequency will be impressed upon transformer coil 38, while an electromotive force of a lower frequency will be impressed upon the transformer coil 39.

The resultant of the fluxes in the transformer 35, due to the different frequencies impressed upon it, will cause an electromotive force to be induced in auxiliary coil 40 which corresponds to the difference between the two frequencies. When the electromotive force induced in transformer coil 40 has been rectified, it will appear on relay coil 9 as a series of direct current impulses whose frequency will be the difference of the frequencies impressed upon transformer coils 38 and 39.

The result of impressing the impulses on relay 9 will be the alternate opening and closing of the circuits to relays 24 and 27 through contact members 11 and 12. By thus operating both relays 24 and 27 within the time period determined by the vibrating relay 13, contacts 29 and 30 are open and held open so as to prevent energization of trip coil 23.

It will thus be seen that I have provided an inexpensive and reliable means for protecting a synchronous machine by de-energizing the winding of the machine in the event that the machine fails to rotate within a predetermined time after it is energized.

In compliance with the requirements of the patent statutes, I have shown and described herein a preferred embodiment of my invention and a modification thereof. It is understood, however, that the invention is not limited to the precise construction shown and described, but is capable of modification by one skilled in the art, the embodiments herein shown being illustrative of the principles of my invention.

I claim as my invention:

1. In a locked rotor protective system for a synchronous machine, in combination, a starting switch for connecting the machine to be energized from a source of power, auxiliary switch means, means for closing the auxiliary switch means when the starting switch is closed, a vibrating relay having means for making a circuit when the relay is energized and having means for alternately breaking and making said circuit for a predetermined time after being de-energized and for holding said circuit open after said predetermined time, circuit means for energizing said vibrating relay when the auxiliary switch means is closed, a slow release relay connected to be energized by said vibrating relay circuit making means and having a release time greater than the time between breaking and making of the vibrating relay circuit control means, a first relay connected in circuit to be energized when the slow release relay is energized, back contact members operated by said first relay to be opened when said first relay is energized, said back contact members being connected in circuit to control the energization of said vibrating relay, said first relay having front contact members connected in circuit to hold said first relay energized, a second relay, a third relay and a fourth relay, means governed by the rotation of the machine for alternately energizing and de-energizing said fourth relay when the machine is rotating and for holding said fourth relay either energized or de-energized when the machine is not rotating and the said starting switch is closed, a back contact member controlled by said fourth relay connected in circuit with said front contact members of said first relay and said second relay to control said second relay, said second relay having front contact members connected in circuit with said front contact members of said first relay to hold said second relay energized, said fourth relay having front contact members connected in circuit with the front contact members of said first relay and said third relay to control said third relay, said third relay having front contact members connected in circuit with said front contact members of said first relay to hold said third relay energized, said second and third relays having back contact members which are opened when said second and third relays are energized, a second front contact member controlled by said first relay, a back contact member controlled by said slow release relay, opening means for said starting switch, a circuit including said opening means, said back contact members of said slow release relay and said second front contact members of said first relay in series with a parallel circuit having the back contact members of said second relay in one branch and the back contact members of said third relay in the other branch.

2. In a locked rotor protective system for a synchronous machine, in combination, a starting switch for connecting the machine to be energized from a source of power, auxiliary switch means, means for closing the auxiliary switch means when the starting switch is closed, a vibrating relay having means for making a circuit when the relay is energized and having means for alternately breaking and making said circuit for a predetermined time after being de-energized and for holding said circuit open after said predetermined time, circuit means for energizing said vibrating relay when the auxilary switch means is closed, a slow release relay connected to be energized by said vibrating relay circuit making means and having a release time greater than the time between breaking and making of the vibrating relay circuit control means, a first relay connected in circuit to be energized when the slow release relay is energized, back contact members operated by said first relay to be opened when said first relay is energized, said back contact members being connected in circuit to control energization of said vibrating relay, said first relay having front contact members connected in circuit to hold said first relay energized, a second relay, a third relay and a fourth relay, means governed by the rotation of the machine for alternately energizing and de-energizing said fourth relay when the machine is rotating and for holding said fourth relay either energized or de-energized when the machine is not rotating and the said starting switch is closed, a back contact member controlled by said fourth relay connected in circuit with said front contact members of said first relay and said second relay to control said second relay, said second relay having front contact members connected in circuit with said front contact members of said first relay to hold said second relay energized, said fourth relay having front contact members connected in circuit with the front contact members of said first relay and said third relay to control said third relay, said third relay having front contact members connected in circuit with said front contact members of said first relay to hold said third relay energized, said second and third relays having back contact members which are opened when said second and third relays are energized, a second front contact member controlled by said first relay, a back contact member controlled by said slow release relay, opening means for said starting switch, a circuit including said opening means, said back contact members of said slow release relay and said second front contact members of said first relay in series with a parallel circuit having the back contact members of said second relay in one branch and the back contact members of said third relay in the other branch, said second and third relays having other back contact members in series circuit with an indicating device.

3. In a locked rotor protective system for a synchronous machine, in combination, a starting switch for connecting the machine to be energized from a source of power, auxiliary switch means, means for closing the auxiliary switch means when the starting switch is closed, a vibrating relay having means for making a circuit when the relay is energized and having means for alternately breaking and making said circuit for a predetermined time after being de-energized and for holding said circuit open after said predetermined time, circuit means for energizing said vibrating relay when the auxiliary switch means is closed, a slow release relay connected to be energized by said vibrating relay circuit making means and having a release time greater than the time between breaking and making of the vibrating relay circuit control means, a first relay connected in circuit to be energized when the slow release relay is energized, back contact members operated by said first relay to be opened when said first relay is energized, said back contact members being connected in circuit to control energization of said vibrating relay, said first relay having front contact members connected in circuit to hold said first relay energized, a second relay, a third relay and a fourth relay, means governed by the rotation of the machine for alternately energizing and de-energizing said fourth relay when the machine is rotating and for holding said fourth relay de-energized when the machine is not rotating and the said starting switch is closed, a back contact member controlled by said fourth relay connected in circuit with said front contact members of said first relay and said second relay to control said second relay, said second relay having front contact members connected in circuit with said front contact members of said first relay to hold said second relay energized, said fourth relay having front contact members connected in circuit with the front contact members of said first relay and said third relay to control said third relay, said third relay having front contact members connected in circuit with said front contact members of said first relay to hold said third relay energized, said second and third relays having back contact members which are opened when said second and third relays are energized, a second front contact member controlled by said first relay, a back contact member controlled by said slow release relay, opening means for said starting switch, a circuit including said opening means, said back contact members of said slow release relay and said second front contact members of said first relay in series with a parallel circuit having the back contact members of said second relay in one branch and the back contact members of said third relay in the other branch.

4. In a protective relay system for a synchronous machine, a starting switch for the machine, timing relay means, means for energizing the timing relay when the starting switch is closed, a first relay, means governed by the rotation of the machine for causing impulses to be impressed upon the coil of said first relay, a second relay, said first relay having back contact members connected in circuit with said second relay, a third relay, said first relay having front contact members connected in circuit with said third relay, circuit means for holding said second and third relays energized after their initial energization through the contact members of said first relay, a trip means for the circuit breaker, back contact members controlled by said timing relay means which are closed at a predetermined time after the initial energization of said timing relay means, said back contact members of said second and third relays being included in circuit with said trip device and said back contact members of said timing relay means in such a manner as to complete a circuit to energize said trip device when the back contact members of the timing relay close in the event that either the second or third relay has not been energized as a result of rotation of the synchronous machine.

5. In a protective relay system for a synchronous machine, a starting switch for the machine, timing relay means, means for energizing the timing relay when the starting switch is closed, a first relay, means governed by the rotation of the machine for causing impulses to be impressed upon the coil of said first relay, a second relay, said first relay having back contact members connected in circuit with said second relay, a third relay, said first relay having front contact members connected in circuit with said third relay, circuit means for holding said second and third relays energized after their initial energization through the contact members of said first relay, a trip means for the circuit breaker, back contact members controlled by said timing relay means which are closed at a predetermined time after the initial energization of said timing relay means, said back contact members of said second and third relays being included in circuit with said trip device and said back contact members of said timing relay means in such a manner as to complete a circuit to energize said trip device when the back contact members of the timing relay close in the event that either the second or third relay has not been energized as a result of rotation of the synchronous machine, an indicating means, and a circuit including said indicating means and front contact members on said second and third relays so that said indicating means will be energized in the event that the machine rotates.

6. In a protective system for an electrically driven rotating machine, in combination, a starting switch for energizing the machine, timing means responsive to the operation of the starting switch for opening the starting switch at a predetermined time after the starting switch is closed, a circuit interrupter, means whereby the rotation of the machine intermittently actuates the interrupter, and relay means controlled by said interrupter for rendering the means for opening the starting switch inoperative in the event that the machine rotates within the time determined by the timing means.

7. In a locked rotor protective device for a synchronous motor, in combination, a starting switch for the motor, timing means responsive to the closure of the starting switch for opening the starting switch at a predetermined time after the closure of said starting switch, means for so combining the voltage at the frequency of the source to which the motor is connected with the voltage of the frequency of the electromotive force induced in the field winding of the motor as to obtain a resultant voltage whose frequency is the difference of the two frequencies so that the resultant voltage will be pulsating only when the rotor is rotating, and relay means controlled by said pulsations for rendering the means for opening the starting switch inoperative in the event that the rotor rotates and thus produces said pulsating voltage within the time determined by the timing means.

8. In a protective system for a synchronous motor, in combination, a starting switch for the motor, timing means responsive to the closure of the starting switch for opening the starting switch at a predetermined time after the closure of said starting switch, means for so combining the voltage at the frequency of the source to which the motor is connected with the voltage of the frequency of the electromotive force induced in the field winding of the motor as to obtain a resultant voltage whose frequency is the difference of the two frequencies so that the resultant voltage will be pulsating only when the rotor is rotating, an indicating device, relay means controlled by said resultant voltage for actuating said indicating device and for rendering said means for opening said starting switch inoperative in the event that the rotor rotates and thus produces said pulsating voltage within the time determined by the timing means.

9. In a protective starting system for a synchronous motor, in combination, a starting switch for energizing the machine, timing means responsive to the closure of the starting switch for opening the starting switch at a predetermined time after the starting switch is closed, impulse generating means rendered operative by the closure of the starting switch whereby the rotation of the machine produces a series of impulses, and relay means controlled by said impulses for rendering the timing means for opening the said starting switch inoperative in the event that the machine rotates within the time determined by the timing means.

MATHIAS MICHEL.